United States Patent

Schnell et al.

Patent Number: 5,381,080
Date of Patent: Jan. 10, 1995

[54] CONTROL DEVICE

[75] Inventors: Klaus Schnell, Gau-Algesheim; Günther Hahlganss, Kriftel, both of Germany

[73] Assignee: VDO Adolf Schindling AG, Frankfurt Am Main, Germany

[21] Appl. No.: 18,823

[22] Filed: Feb. 18, 1993

[30] Foreign Application Priority Data

Feb. 26, 1992 [DE] Germany .................. 4205875

[51] Int. Cl.$^6$ .................. B23Q 35/24; B25J 19/02
[52] U.S. Cl. .................. 318/566; 318/568.1; 318/628; 318/162
[58] Field of Search .................. 318/560, 567, 568.13, 318/568.14, 568.16, 568.17, 568.25, 652, 671, 676, 566, 568.1, 628, 646, 162, 1

[56] References Cited

U.S. PATENT DOCUMENTS 5,012,292 4/1991 Ruff .................. 335/253
5,191,971 3/1993 Hakkarainen .................. 200/550

Primary Examiner—Bentsu Ro
Attorney, Agent, or Firm—Martin A. Farber

[57] ABSTRACT

A control device, particularly a rotary controller for manual entry of information into an electronic device, has a setting member the position of which can be changed under the effect of an actuating force. The setting member is connected with a generator for producing electric signals which characterize the position of the setting member. A drive element is connected with the setting member and, under the control of the electric signals, exerts a force on the setting member which acts in the same direction as or in the direction opposite to the actuating force, depending on the position of the setting member for haptic acknowledgement of the operation of the setting member.

12 Claims, 2 Drawing Sheets

CONTROL DEVICE

FIELD AND BACKGROUND OF THE INVENTION

The present invention relates to a control device, particularly a rotary controller for manually inputting information into an electronic device.

Rotary controllers have long since proven their value for the operation of different devices and systems. For the inputting of analog values such as, for instance, volume and temperature, a given angular position of a rotary controller is generally associated with the variable to be introduced. Rotary controllers having an increment generator produce a differential change in the previously entered or predetermined variables. Such rotary controllers can also be used in suitable devices for selecting different functions by means of menus.

The use of rotary controllers is frequently facilitated by haptic acknowledgement—for instance by a reset moment, by stops, friction or by detents. In known rotary controllers, this acknowledgement is established by their mechanical construction and thus rigidly determined.

SUMMARY OF THE INVENTION

It is an object of the present invention to make a freely available haptic acknowledgement possible in a control device, particularly a rotary controller.

According to the invention, there are provided a setting member (1, 4) the position of which can be varied under the action of an actuating force of a person, and which is connected to a transducer (2) for the production of electrical signals which characterize the position of the setting member (1, 4). Additionally, there is provided a drive element (3, 6) including a motor (6) which is connected with the setting member and, under the control of the electrical signals, exerts a force on the setting member, the size and direction of the force being dependent on the position of the setting member (1, 4).

By the electrical production of the force acting on the setting member in addition to the actuating force, it is possible to influence the resultant force in various ways. Thus, for instance, the force produced by the mechanical action of a detent, a reset moment or a stop can be electrically imitated or, if desired, action of such mechanical force can be disconnected.

A further development of the invention provides that the transducer is an increment generator (2) which produces pulses as a function of the path or angle of a displacement of the setting member and of the direction of displacement or rotation. In this connection, it is preferably provided that addresses for a table deposited in a memory (11) can be produced from said pulses, in which table control signals for the drive element (6) are stored as a function of the address.

By the depositing of tables in a memory, different haptic acknowledgements can be realized. The use of an increment generator makes possible advantageous communication between the control device of the invention and the device to be controlled by means of digital signals.

Adaptation of the haptic acknowledgement to the situation present upon the existing state of control of the device to be controlled is possible, in accordance with a further aspect of the invention, wherein different functions can be loaded into the memory (11) under the control of a device (14) which is connected to the control device. For the same purpose it can also be provided that the table contains several different functions one of which in each case can be selected via one or more binary digits of an address fed to the memory (11).

For many uses of the control device of the invention, an embodiment is advantageous which provides that a torque function of the motor has substantially identical, periodically recurring sections. In this way there is produced a control device with identical detent steps in which, for instance, the number of detent steps can be adapted to a specific control situation.

Detent steps of different size can also be selected, in which case the force expended from detent step to detent step may also be of different amount. Thus, for instance, two detent points which are frequently set in operation lie close to each other and/or are separated from each other by a slight "detent force", while the movement of the control device into a position which is used only by way of exception is made difficult by a large path and/or a large opposing force.

Depending on the state of operation of a connected device, a detent point can also be connected and disconnected. Thus, the control device of the invention can serve as moment (rotation) sensor or as detent switch.

Within the scope of the invention, however, the selection of other functions is also possible in order, for instance, to produce a resetting moment or friction in the actuating element.

The nature of the haptic acknowledgement can, in accordance with other advantageous embodiments of the invention, also be influenced in the manner that the form of the function is variable within a section and/or that the extreme values of the function are variable.

Depending on the specific design of the control device of the invention, it may be necessary to prevent oscillations caused by the action of the drive element in combination with the control by the output signals of the transducer. In accordance with yet another aspect of the invention, this can be accomplished by a damping element (7, 18) electrically coupled to the motor and employed with the setting member (1, 4).

Another feature of the invention is characterized by a combination with a device (14) which has a display means (14') for showing selection menus with selection points, the torque function of the motor of the drive element being adapted to be controlled as a function of the number and position of the selection points of the menu on the display means (14').

This feature makes possible a substantial improvement in the control of devices and systems which include user assistance by means of selection menus. These can be any desired electronic devices which have suitable digital signal processing and display means, for instance a television tube or an LCD screen.

In order to make it difficult to enter by mistake one or more predetermined selection possibilities, it is provided, in one advantageous embodiment of this feature, that the force of the drive element (motor 6) acting against the actuating force is particularly great when a predetermined selection point is to be left.

Another feature of the invention is the construction of the control device as rotary controller (1, 2) with a push-button (1, 15).

BRIEF DESCRIPTION OF THE DRAWINGS

With the above and other objects and advantages in view, the present invention will become more clearly understood in connection with the detailed description of a preferred embodiment, when considered with the accompanying drawings, of which.

Identical parts are provided with identical reference numbers in the figures.

DETAILED DESCRIPTION OF THE PREFERRED EMBODIMENT

Figure 1:
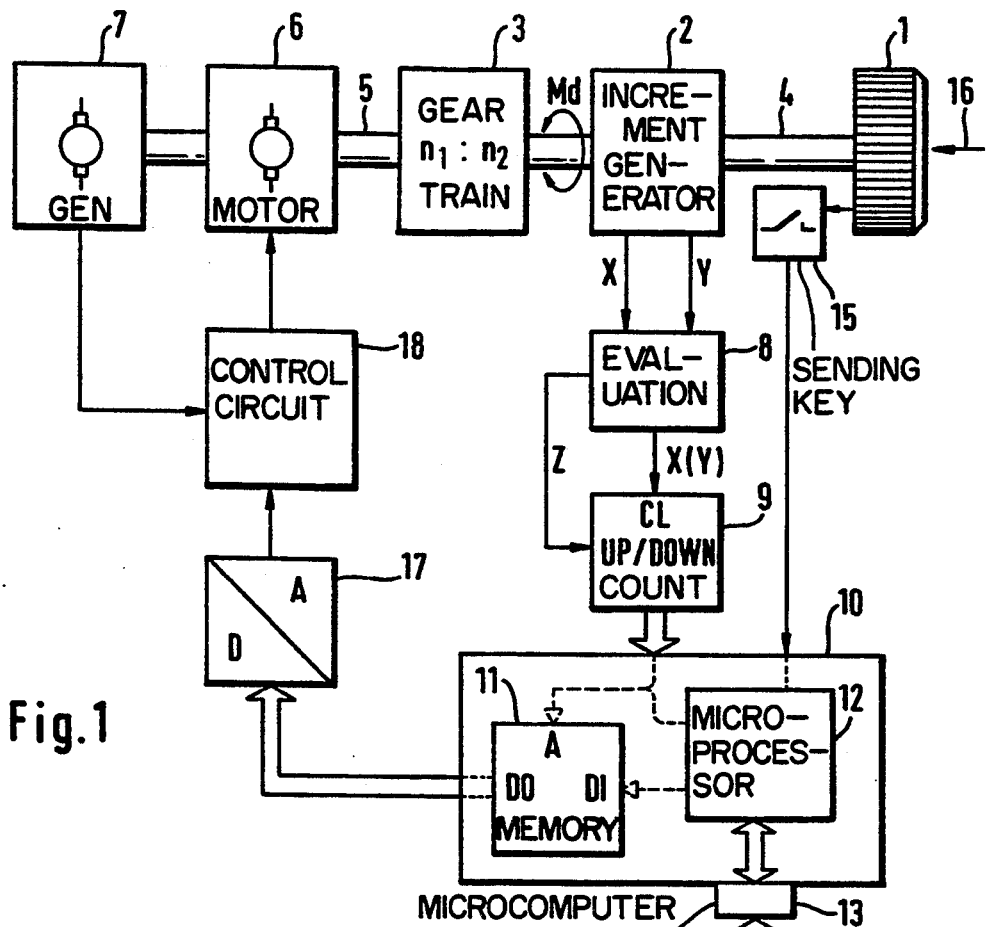
FIG. 1 is a block diagram of one embodiment of a control device incorporating the invention.

In an embodiment of the control device of the invention shown in FIG. 1, a rotary knob 1, an increment generator 2 and a gearing 3 are connected to each other by a common shaft 4. A motor 6 and a generator 7 are present on a drive shaft 5 of the gearing 3. In the embodiment shown in FIG. 1, it is assumed that the connection of the motor 6 to the shaft 4 by a gearing 3 is advantageous because of the characteristics of the motor 6—for example, low torque. However, within the scope of the invention it is also possible to use a suitable motor without gearing.

In known manner, the increment generator 2 produces two pulses X and Y per angle increment of the shaft 4, which pulses are shifted in phase from each other, whereby the direction of rotation of the shaft 4 is determined in an evaluation circuit 8. The circuit 8 drives an incremental/decremental counter 9. By means of a direction-of-rotation signal Z, outputted by the circuit 8 to the counter 9, and one of the pulses X or Y applied to the clock (CL) input terminal of the counter 9, the counter 9 is controlled. At outputs of the counter 9, there is obtained a digital signal which describes the angular position of the rotary knob 1 with respect to any desired starting position.

The instantaneous reading of the counter 9 is fed into a microcomputer 10 which is of known construction and of which only the parts necessary for an understanding are shown, namely a write/read memory 11 for the depositing of a table of data, a microprocessor 12, and an interface 13. The interface 13 serves for connection with a device 14 to be controlled, which has a picture screen 14'.

To the rotary knob 1 there is connected a sending key 15 which, when the rotary knob 1 is pushed in the direction of the arrow 16, gives off a signal to the microcomputer 10.

One output of the microcomputer 10 is connected, via a digital/analog converter 17, to a control circuit 18 for the motor 6. This circuit contains known output stages and control circuits. The output voltage of the generator 7 is also fed to the control circuit 18 in order to obtain a damping action.

Upon a writing of the data table into the write/read memory 11, an addressing and a feeding of the data to be recorded are effected by the microprocessor 12. During a control process, the addressing of the write/read memory 11 is effected by the counter 9 while the data read out is fed from a data output DO to the digital/analog converter 17. Furthermore, by the control process, the output signals of the counter 9 are fed, via the microprocessor 12 and the interface 13, to the device 14 to be controlled. The different paths of the data and addresses are shown in dash line in the microcomputer 10.

Figure 2:
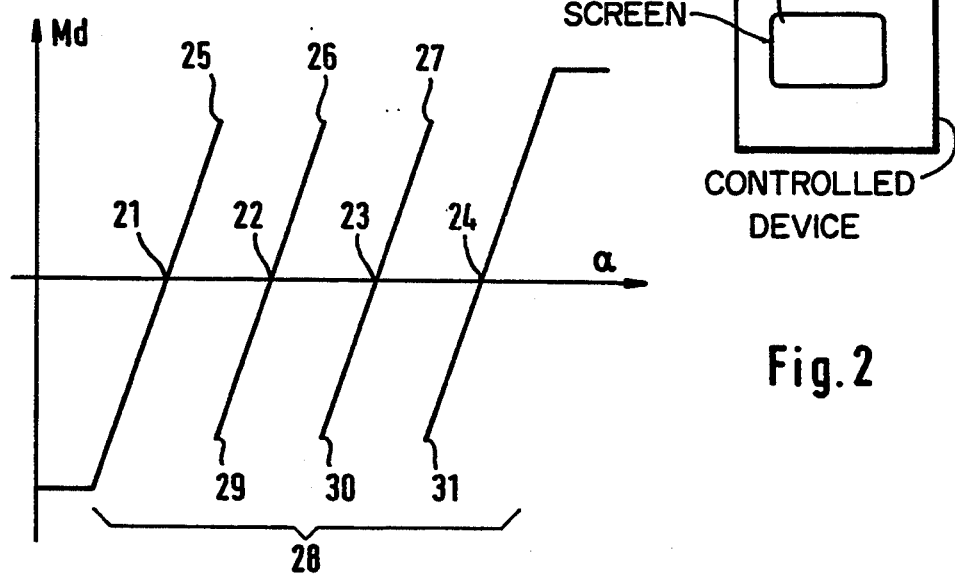
FIG. 2 is a graph showing a moment of rotation as a function of the angle of rotation in the case of a rotary controller.

Upon a placing in operation of the device 14 or upon a change in the state of operation which requires a different control operation, data of a table are fed by the device 14 via the interface 13 to the microcomputer 10 and are deposited in the write/read memory 11. The content of one such table is shown as a graph of a moment of rotation Md of the motor 6 as function of an angle of rotation $\alpha$ of the drive shaft 5 in FIG. 2. At the points of intersection 21, 22, 23, 24 of the curves with the zero axis of the moment of rotation Md, there are detent points of the rotary controller.

If the angle of rotation $\alpha$ is increased manually starting from these points, then a positive moment of rotation Md is produced which is directed in the direction opposite the actuating force and strives to reduce the angle of rotation $\alpha$. If the operator, by a corresponding expenditure of force, passes beyond one of the points 25, 26, 27, then the moment of rotation produced by the motor 6 suddenly reverses its direction so that the rotary controller is moved even without external expenditure of force to the following detent points 22, 23, 24, i.e. engaged. The same applies for manual movement in the opposite direction.

At the ends of a displacement range 28 established by the motor function, the moment of rotation Md assumes in each case a value which lies within limits which are established by the mechanical characteristics of the motor and by the permissible loss power. The extreme values 25, 26, 27 and 29, 30, 31 can be selected within these limits with respect to the specific case of use and possibly also adapted to the specific operator.

The advantageous interaction of a user guide by means of menus with the control device of the invention will be explained with reference to FIGS. 3a–3h. In each of FIGS. 3a, 3c, 3e and 3g there is shown a menu displayed on the screen 14' and to the right of the menus, in each of FIGS. 3b, 3d, 3f and 3h, there is shown a function adapted to the respective menu, which function is deposited in the table. The menu shown in FIG. 3a has five selection points A to E. A cursor (not shown) is brought by the control device of the invention to one of the selection points. The function deposited for this process in the write/read memory 11 has five detent points which are marked similar to the selection points.

Figure 3A:
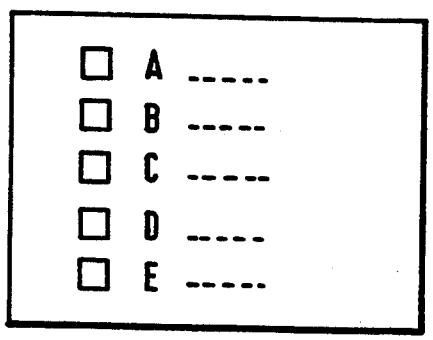
FIGS. 3a to 3h show several examples of this function in connection with selection menus adapted thereto.
Figure 3B:
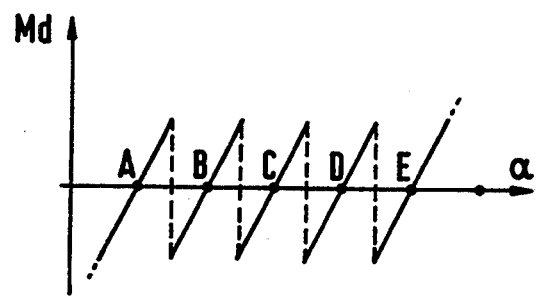
Figure 3C:
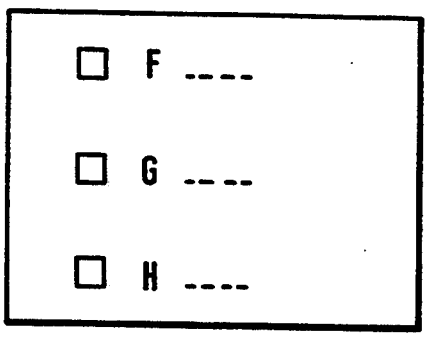
Figure 3D:
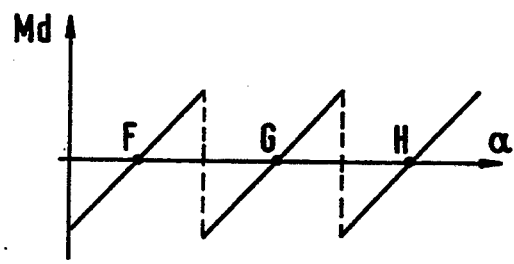

After a selection from the menu shown in FIG. 3a, the user comes, for instance, into the menu shown in FIG. 3c, which has only three selection points F, G, H. In order to make a selection here by means of the rotary knob 1 (FIG. 1), the function shown in FIG. 3c is recorded in the write/read memory 11. This function produces only three detent points F, G, H. However, they are distributed over the same angle of rotation (FIG. 3d) as the five detent points A to E in connection with the menu of FIG. 3a. This has the advantage that the user need not change his habit with respect to the path which the cursor moves over the screen per unit angle of rotation. Nevertheless, detent points are located at the correct points, fitting the menu.

Figure 3E:
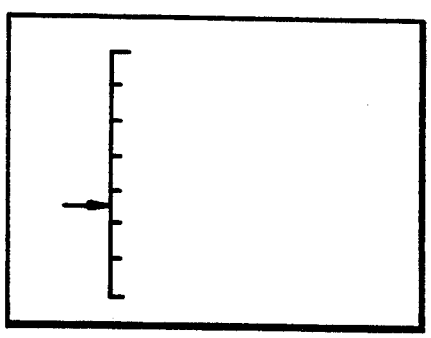
Figure 3F:

If the user, by depressing the rotary knob 1, selects a point of the menu in FIG. 3c, he receives, for instance, a request to indicate an analog value, the screen image shown in FIG. 3e appearing. Instead of the quasi-analog display, a digital display can also be provided. For this control process, zero values are entered into the write/read memory 11 (FIG. 1) so that the motor 6 does not exert any torque on the shaft 4. The user can now set an analog value without haptic acknowledgement and enter it by pressing on the rotary knob 1. As an alternative, FIG. 3f shows in dashed line a function which produces resilient stops at the ends of the setting range.

Figure 3G:
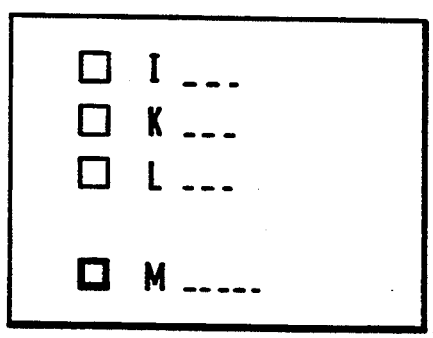
Figure 3H:
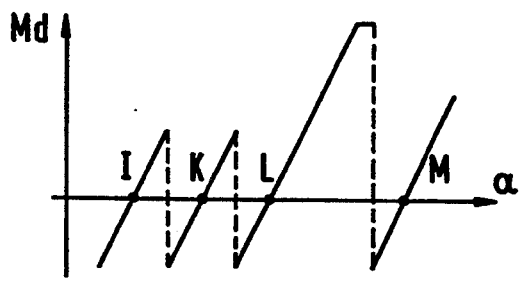

After this operation, a menu is called up in the example described, this menu being shown in FIG. 3g. In this case, three selection points I, K, L are accessible as part of routine operation. The function shows corresponding detent points I, K, L. Another selection point M is set off spatially and possibly in color somewhat on the menu and associated with a device function which is not intended to be carried out routinely—for instance one for which increased attention of the operator is necessary. The corresponding detent point M of the function is located in the menu with due consideration of the geometrical conditions. The moment of rotation Md, however, assumes a substantially higher value (FIG. 3h) between the detent points L and M, whereby the user is warned before the selection of M.

The invention is not limited to the embodiment shown but can be improved and further developed within the scope of the knowledge of the person skilled in the art. Thus, for instance, instead of a rotary control, a linear control or lever can also be used. Furthermore, the control device of the invention can be combined advantageously with other control devices, such as, for instance, push buttons and joysticks.

We claim:

1. A control device for manually inputting information into an electronic device, comprising
    a setting member the position of which can be varied under the action of an actuating force;
    a transducer connected to said setting member for the production of electrical signals which characterize a position of the setting member; and
    a drive element which is connected with the setting member and is operative in response to electrical signals, said drive element exerting a force on said setting member, the size and direction of said force being dependent on the position of the setting member.

2. A control device according to claim 1, wherein, said transducer is an increment generator which produces pulses as a function of a path or angle of displacement of said setting member of the direction of said rotation.

3. A control device according to claim 2, further comprising
    a memory for storing a data table and being addressable for reading the data;
    wherein control signals for said drive element are provided in the table, and are stored in said memory as a function of memory address.

4. A control device according to claim 3, further comprising a controlled device connected to the control device, wherein said memory has space for storage of different functions to be loaded into the memory under the control of said controlled device.

5. A control device according to claim 3, wherein the table contains several different functions one of which is selected via one or more binary digits of an address applied to said memory.

6. A control device according to claim 3, wherein a torque function of the drive element has substantially identical, periodically recurring sections.

7. A control device according to claim 6, wherein the torque function has a form which is variable within a section.

8. A control device according to claim 6, wherein there are extreme values of the torque function, the extreme values being variable.

9. A control device according to claim 1, further comprising
    a damping element operative which said drive element upon activation of said setting member.

10. A control device according to claim 1, further comprising a controlled device which has a display means for showing selection menus with selection points, a torque function of said drive element being adapted to be controlled as a function of the number and the position of the selection points of the menu on said display means.

11. A control device according to claim 10, wherein there are different values of the force of the drive element acting against the actuating force, the force of the drive element having a maximum value for a specific selection point.

12. A control device according to claim 1, wherein the control device comprises a rotary controller with a push-button.

* * * * *